US012529351B2

(12) United States Patent
Farrell et al.

(10) Patent No.: US 12,529,351 B2
(45) Date of Patent: *Jan. 20, 2026

(54) EFI THROTTLE BODY WITH SIDE FUEL INJECTORS

(71) Applicant: Fuel Injection Technology Inc., Riverside, CA (US)

(72) Inventors: Kenneth William Farrell, Corona, CA (US); Jeremy Lynn Schmidt, Corona, CA (US)

(73) Assignee: FUEL INJECTION TECHNOLOGY INC., Riverside, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/678,796

(22) Filed: May 30, 2024

(65) Prior Publication Data

US 2025/0003378 A1 Jan. 2, 2025

Related U.S. Application Data

(63) Continuation of application No. 17/806,696, filed on Jun. 13, 2022, now Pat. No. 12,012,919, which is a continuation of application No. 17/204,175, filed on Mar. 17, 2021, now Pat. No. 11,391,255, which is a continuation of application No. 16/130,786, filed on Sep. 13, 2018, now Pat. No. 10,961,968, which is a continuation of application No. 15/336,684, filed on Oct. 27, 2016, now Pat. No. 10,100,798, which is a
(Continued)

(51) Int. Cl.

| | |
|---|---|
| ***F02D 9/10*** | (2006.01) |
| ***F02M 51/00*** | (2006.01) |
| ***F02M 63/00*** | (2006.01) |
| ***F02M 63/02*** | (2006.01) |
| ***F02M 69/04*** | (2006.01) |
| ***F02M 69/46*** | (2006.01) |
| ***F02M 69/52*** | (2006.01) |
| ***F02M 69/54*** | (2006.01) |

(52) U.S. Cl.

CPC ......... *F02M 69/043* (2013.01); *F02D 9/1035* (2013.01); *F02D 9/105* (2013.01); *F02M 51/005* (2013.01); *F02M 63/0056* (2013.01); *F02M 63/02* (2013.01); *F02M 69/462* (2013.01); *F02M 69/52* (2013.01); *F02M 69/54* (2013.01)

(58) Field of Classification Search

CPC .. F02M 69/043; F02M 69/044; F02M 69/052; F02D 9/105; F02D 9/1095

USPC ................................ 123/336, 337, 445, 472

See application file for complete search history.

(56) References Cited

U.S. PATENT DOCUMENTS

2013/0298871 A1* 11/2013 Bennett .................. F02M 29/04 123/445

2014/0123944 A1* 5/2014 Benoit .................. F02M 17/34 123/445

OTHER PUBLICATIONS

U.S. Appl. No. 12/012,919 including its entire prosecution history, filed Jun. 18, 2024, Farrell, Kenneth William.

* cited by examiner

*Primary Examiner* — Erick R Solis

(74) *Attorney, Agent, or Firm* — Knobbe Martens Olson & Bear LLP

(57) ABSTRACT

An electronic fuel injection throttle body unit has a core body with two side components. The two side components each including a fuel delivery passage. Four air intake passages extending vertically through the throttle body. Valves are rotatable within the air intake passages. The valves being connected to valve shafts that rotate about
(Continued)

respective valve shaft axes. The valve shaft axes and the fuel delivery passages are perpendicular to each other.

20 Claims, 15 Drawing Sheets

Related U.S. Application Data continuation of application No. 15/194,235, filed on Jun. 27, 2016, now Pat. No. 9,482,198, which is a continuation of application No. 14/994,966, filed on Jan. 13, 2016, now Pat. No. 9,376,997.

EFI THROTTLE BODY WITH SIDE FUEL INJECTORS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

This application is a continuation of U.S. patent application Ser. No. 17/806,696, filed Jun. 13, 2022, which is a continuation of U.S. patent application Ser. No. 17/204,175, filed Mar. 17, 2021, which is a continuation of U.S. patent application Ser. No. 16/130,786, filed Sep. 13, 2018, which issued on Mar. 30, 2021, as U.S. Pat. No. 10,961,968, which is a continuation of U.S. patent application Ser. No. 15/336,684, filed Oct. 27, 2016, which issued Oct. 16, 2018, as U.S. Pat. No. 10,100,798, which is a continuation application of U.S. patent application Ser. No. 15/194,235, filed Jun. 27, 2016, which issued Nov. 1, 2016, as U.S. Pat. No. 9,482,198, which is a continuation application of U.S. patent application Ser. No. 14/994,966, filed Jan. 13, 2016, which issued Jun. 28, 2016 as U.S. Pat. No. 9,376,997, each of which is hereby expressly incorporated by reference in its entirety.

BACKGROUND OF THE INVENTION

Field of the Invention

The present disclosure pertains to fuel injection systems. More particularly, certain features of the present disclosure pertain to throttle body electronic fuel injection systems having improved sizing and fuel supply attributes.

Description of the Related Art

Existing bolt-on electronic fuel injection (EFI) throttle bodies have been constructed to approximate the appearance of prior carburetor designs. Following on those prior carburetor designs, the length of the EFI throttle bodies exceeds the width of the EFI throttle bodies. To define the width, one simply looks to the location of a throttle linkage. The throttle linkage typically is positioned along a side of the throttle body and the throttle linkage pivots in a plane. The direction normal to that plane is the width and the direction parallel to the plane is the length.

While the existing EFI throttle bodies successfully emulate existing carburetor design, those existing EFI throttle bodies had several drawbacks. Certain features, aspects and advantages of the present disclosure are designed to address one or more of those drawbacks.

SUMMARY OF THE INVENTION

In accordance with certain features, aspects and advantages of the present disclosure, an electronic fuel injection throttle body comprises a plurality of air intake passages. Each of the plurality of air intake passages comprises a valve. The valve rotates about an axis defined by a shaft. A sleeve is disposed within the air intake passage and comprises an inner surface that defines at least a portion of the air intake passage. A plurality of orifices extend through a wall of the sleeve. Each of the plurality of orifices is angled downward and at an angle to a radial direction. A passage is defined at least in part by the sleeve and the plurality of orifices is fluidly connected to the passage. At least one fuel injector is positioned to inject fuel into the passage. The at least one fuel injector is connected to a fuel rail. The fuel rail comprises a passage that extends in a first direction. The first direction is normal to the axis of the valve shaft.

In some configurations, the plurality of air intake passages extend through a core body. In some such configurations, the passage of the fuel rail is disposed within a first component that is removably connected to the core body. In some such configurations, the fuel injector is positioned between a portion of the core body and the first component. In some such configurations, an electrical connector is connected to the fuel injector and the electrical connector is positioned between a portion of the core body and the first component. In some such configurations, the first component comprises a wall that shrouds the fuel injector from side view. In some such configurations, only a portion of the electrical connector is exposed below the wall that shrouds the fuel injector from side view. In some such configurations, the first component is positioned vertically above the axis defined by the shaft that the valve rotates about.

In some configurations, a linkage is connected to the shaft and the linkage is positioned laterally outward of the first component. In some such configurations, the plurality of air intake passages are positioned side-by-side along the length of the shaft.

In some configurations, the plurality of orifices is positioned upstream in the air intake passage of the valve. In some such configurations, the plurality of orifices intersect a single plane that extends radially across the air intake passage. In some such configurations, the plurality of orifices consists of 20 equally spaced orifices.

In some configurations, the electronic throttle body comprises four vertically extending sides, the first component extending along a first side of the four vertically extending sides and an ECU box being positioned on a second side of the four vertically extending sides. In some such configurations, the first side and the second side are not parallel. In some such configurations, the ECU box comprises a first portion and a second portion, the first portion and the second portion being removably coupled together. In some such configurations, the first portion is integrally formed with the electronic fuel injection throttle body and the second portion defines a removable lid. In some such configurations, the removable lid comprises a front surface and the front surface extends parallel to the axis of the shaft. In some such configurations, the second surface is a front surface of the electronic fuel injection throttle body.

In some configurations, an electronic fuel injection throttle body comprises a top surface and a bottom surface. Four intake passages extend between the top surface and the bottom surface. The four intake passages extend through a core body. A first fuel delivery component is mounted to a first side surface of the core body and a second fuel delivery component is mounted to a second side surface of the core body. At least two fuel injectors are mounted between the core body and the first fuel delivery component and at least two fuel injectors are mounted between the core body and the second fuel delivery component. The first fuel delivery component comprises a first passage and the first passage comprises a first axis. The second fuel delivery component comprises a second passage and the second passage comprises a second axis. The first axis and the second axis are parallel with each other. The first passage and the second passage are interconnected by a transfer passage that is defined within the core body.

The systems, methods and devices described herein have innovative aspects, no single one of which is indispensable or solely responsible for their desirable attributes. Without limiting the scope of the claims, some of the advantageous features will now be summarized.

BRIEF DESCRIPTION OF THE DRAWINGS

Throughout the drawings, reference numbers can be reused to indicate general correspondence between reference elements. The drawings are provided to illustrate example embodiments described herein and are not intended to limit the scope of the disclosure.

DETAILED DESCRIPTION OF THE PREFERRED EMBODIMENTS

Figure 1:
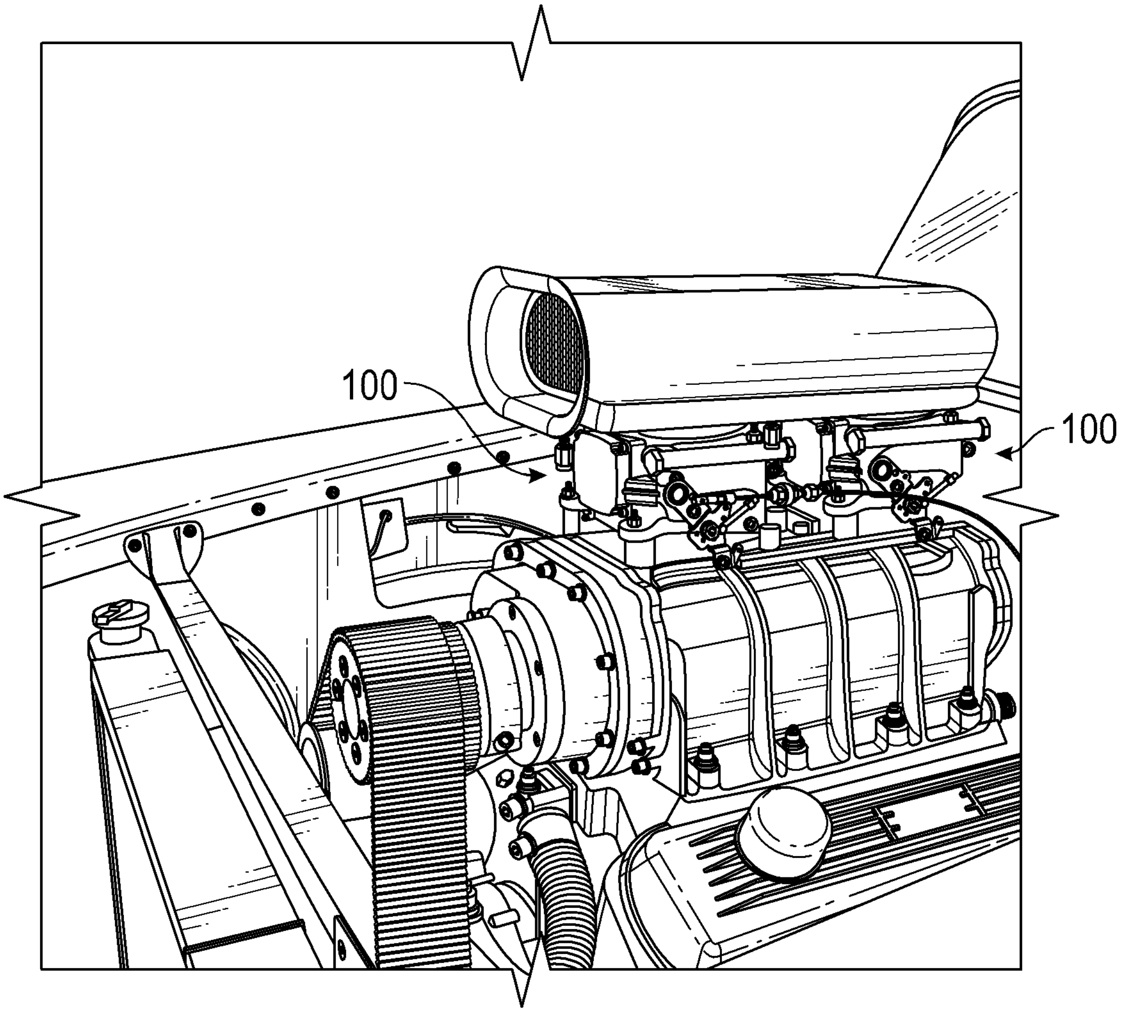
FIG. 1 illustrates two EFI throttle body units installed in a dual-quad configuration.

FIG. 1 illustrates two EFI throttle body units 100 that are arranged and configured in accordance with certain features, aspects and advantages of the present invention. Due to the inventive configuration of the EFI throttle body units 100, two of the EFI throttle body units 100 can be positioned front to back in a dual quad configuration, as shown in FIG. 1. The EFI throttle body units 100 are configured to be compact in nature and, as will be described below, the width of the EFI throttle body units 100 is greater than the length of the EFI throttle body units 100. Because the width is greater than the length, the illustrated throttle body units 100 admit to being positioned front to back in the dual quad arrangement; throttle body units that have a larger front to back length compared to the side to side width cannot be mounted in the same manner. For example, when used with the dual-quad/multi carb manifold available from Edelbrock (e.g., the Edelbrock C-26 Dual Quad Intake Manifold 5425, available from Summit Racing—Part No. EDL-5425, UPC 085347054251), the spacing between the locations for the EFI throttle body units 100 is very tight (i.e., the spacing between the center holes) and a compact front to rear dimension is desired for proper mounting relative to the direction of movement of the throttle linkage.

In the illustrated configuration, the throttle body unit 100 has a height of less than 4 inches, a front to back length of less than 8 inches and a side to side width of less than 10 inches but greater than 8 inches. In some configurations, the front to back length is greater than 7 inches but less than 9½ inches while the side to side width is less than 9½ inches. In some configurations, the front to back length of an envelope defined by the EFI throttle body unit is 7⅝ inches while the side to side width of the envelope is 9^11^⁄16 inches. In configurations, the front to back length of the envelope is 6^3^⁄16 inches. In some configurations, the ratio of length to width is about 0.787. In some configurations, the ratio of length to width is between 0.6 and 0.8. Other dimensions are possible keeping in mind the spacing desired to accommodate dual quad mounting, for example but without limitation.

Figure 2:
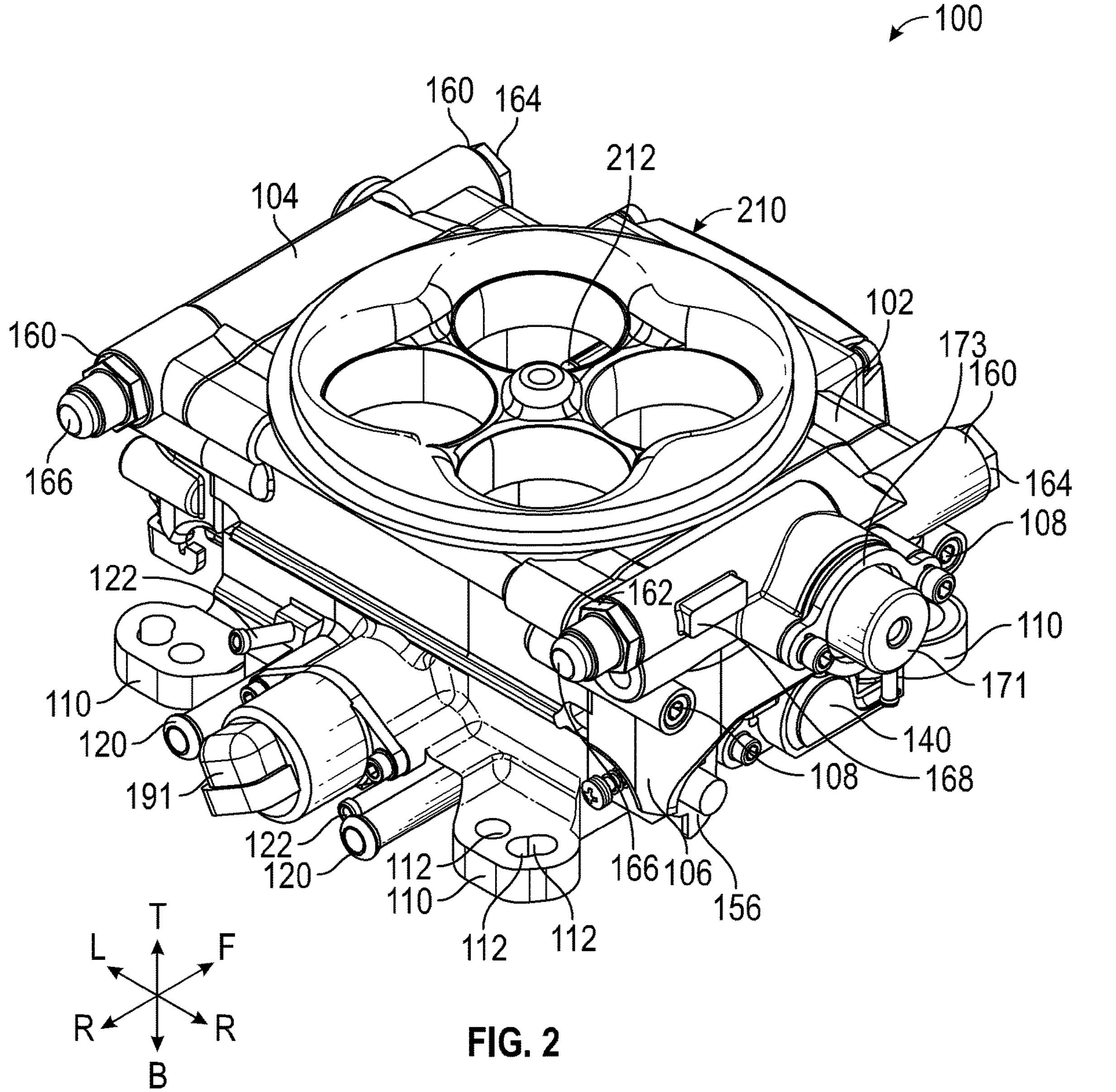
FIG. 2 is a perspective view of an EFI throttle body unit that is arranged and configured in accordance with certain features, aspects and advantages of the present disclosure.

With reference to FIG. 2, further details of the EFI throttle body unit 100 construction will be described. The illustrated unit 100 generally comprises three main components: a core body 102 and a left and a right fuel delivery component 104, 106 that mount to the sides of the core body 102. The components 104, 106 can be secured to the sides of the core body 102 in any suitable manner. In the illustrated configuration, threaded fasteners 108 can be used to connect the components 104, 106 to the sides of the core body 102. Together, the core body 102 and the fuel delivery components 104, 106 define a main body of the EFI throttle body unit 100.

With continued reference to FIG. 2, the illustrated core body 102 includes mounting feet 110. While the mounting feet 110 are integrally formed with the core body 102 in the illustrated configuration, it is possible for the mounting feet 110 to form a portion of a separable mounting plate. In some configurations, the mounting plate may connect with the core body 102. In some configurations, the mounting plate may connect with the left and right components 104, 106. In some configurations, the mounting plate may connect with the core body 102 and the left and right components 104, 106.

As illustrated, each mounting foot 110 comprises a plurality of holes 112. The plurality of holes 112 facilitate mounting of the EFI throttle body unit 100 to any stock or aftermarket manifold currently on the market. In the illustrated configuration, the plurality of holes 112 facilitates mounting to a plurality of different bolt hole patterns. For example, the holes can be 5⅝ inches (or 5.62 inches) on centers front to back (dimension A in FIG. 3) with 5⅛ or 5^3^⁄16 inches (or 5.16 inches) on centers for the outside holes (dimension D) and 4¼ (or 4.25 inches) or 4^5^⁄16 inches (or 4.31 inches) on centers for the inside holes (dimension C), which is a so-called dual bolt pattern. The holes also can include holes that accommodate are 5⅜ inches (or 5.38 inches) front to back (dimension B) and 5⅜ (or 5.38 inches) inches side to side (dimension E). The illustrated configuration features a slot and a hole on each foot 110. The slot in the illustrated configuration is not an ovular slot. The slot in the illustrated configuration is defined by two overlapping circular holes. The slot has an axis defined between the two centerlines of the two overlapping circular holes in a way that will not intersect the bores through the unit 100. In other words, the axis defined by the two centerlines of the two holes angles away from a center vertical plane FA that extends fore and aft as that axis extends toward a center vertical plane SS that extends side to side. The illustrated configuration facilitates bolting of the EFI throttle body unit 100 onto an intake manifold. For example, the holes 112 accommodate the studs used to mount a carburetor onto the intake manifold. The mounting feet 110 can be secured in position using nuts or the like, which can be torqued to 16 pound feet, for example but without limitation. In some configurations, an adaptor plate (e.g., SUM-G1420 available from Summit Racing) is used for mounting of the EFI throttle body unit 100 onto a spread bore four barrel manifold. While it is possible to mount the EFI throttle body unit 100 onto the spread bore four barrel manifold without an adaptor plate, the adaptor plate provides improved port alignment. In some configurations, a gasket (not shown) can be positioned between the EFI throttle body unit 100 and the intake manifold. Any other suitable mounting configuration can be used.

With reference still to FIG. 2, a rear side of the core body 102 comprises a plurality of vacuum ports. As will be explained, the illustrated configuration comprises five vacuum ports; however, any number of vacuum ports can be provided depending upon the application. In some configurations, the vacuum ports can include both ported and manifold ports. In some configurations, the vacuum ports can include ⅜ inch nipples. In some configurations, the vacuum ports can include 3/16 inch nipples. In some configurations, the vacuum ports can include both ⅜ inch nipples and 3/16 inch nipples.

Figure 4:
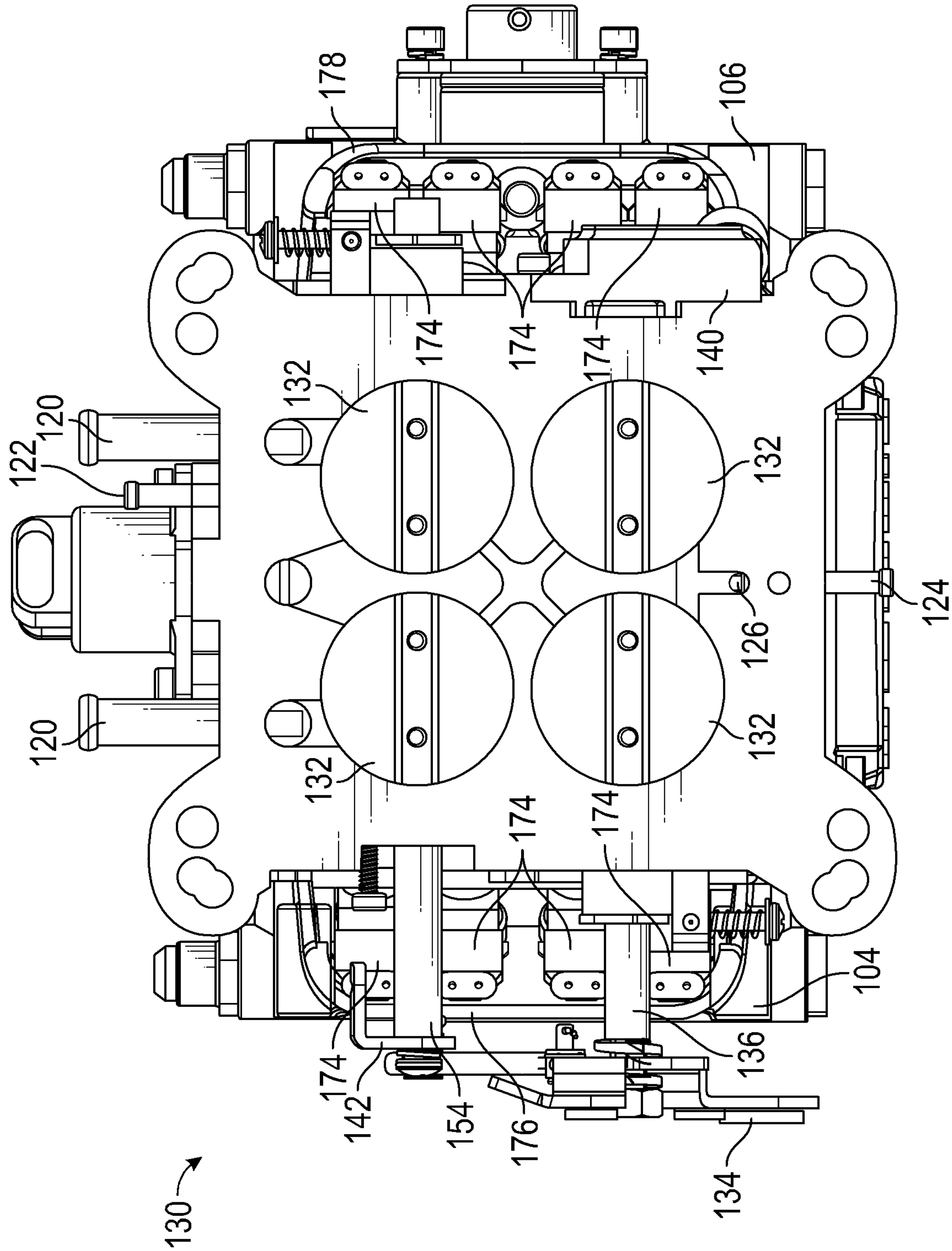
FIG. 4 is a bottom view of the EFI throttle body unit of FIG. 2.
Figure 5:
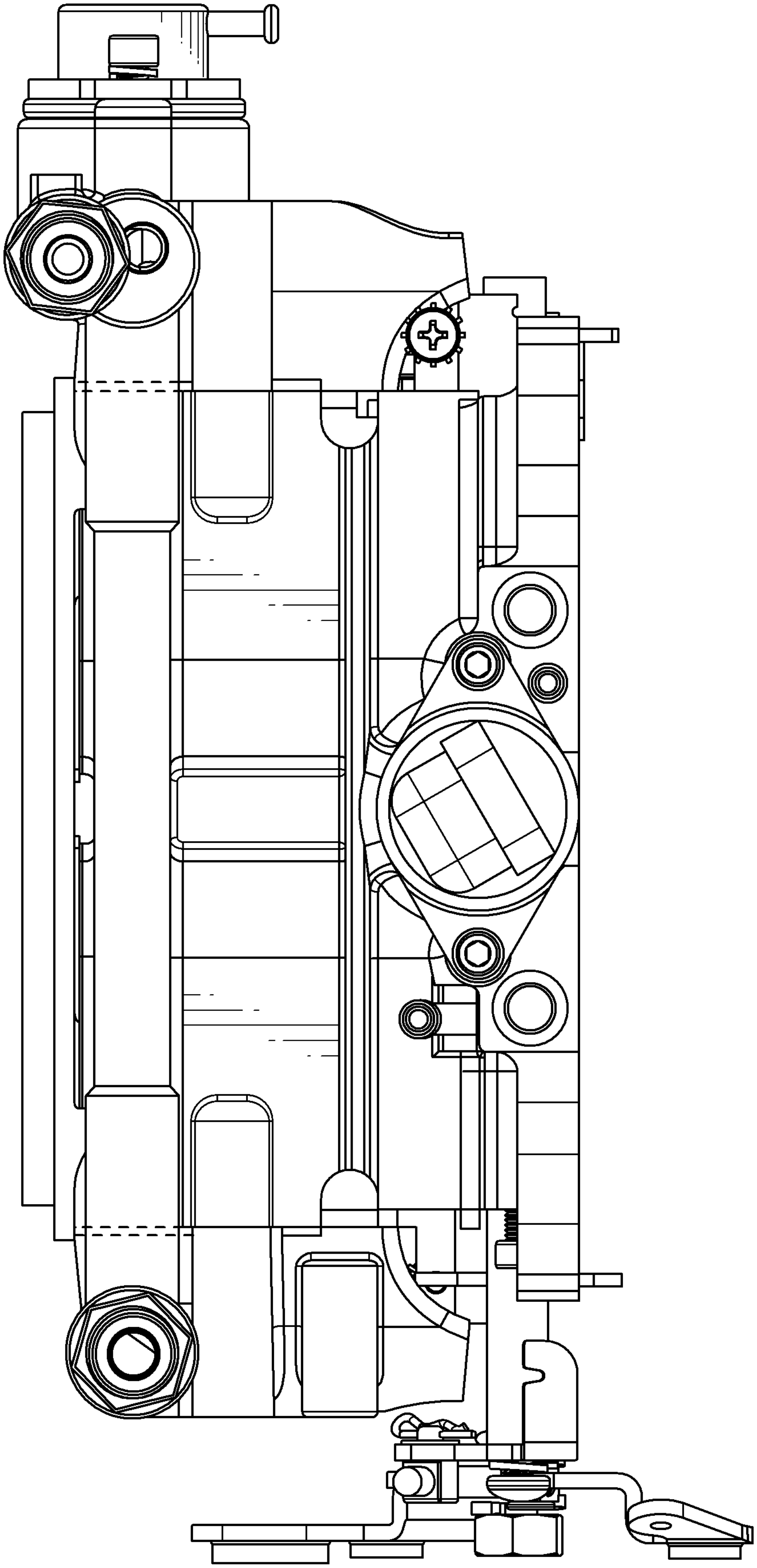
FIG. 5 is a rear view of the EFI throttle body unit of FIG. 2.

As shown in FIG. 2, the rear side of the illustrated core body 102 includes two ⅜ inch nipples 120 that can be used for brake booster and positive crankcase ventilation connections. The rear side of the illustrated core body 102 also includes two 3/16 inch nipples 122 that can be used for un-ported (e.g., manifold vacuum) vacuum needs (e.g., transmission modulator, distributor advance, boost reference, and the like). With reference to FIG. 4, a fifth nipple 124, which is a 3/16 inch nipple in the illustrated configuration, is shown. The fifth nipple 124 can be capped or can be used for boost reference. If the fifth nipple 124 is used for boost reference, a vacuum port 126 that is positioned within the core body 102 should be plugged with a set screw or the like. When not in use, any of the nipples 120, 122, 124 can be capped.

With reference now to FIGS. 3, 4, 5, and 7, a throttle linkage 130 will be described. The throttle linkage 130 provides a connection location for a throttle cable or the like. The throttle linkage 130 translates axial movement of the throttle cable or the like into rotational movement of one or more butterfly valves 132. Any suitable linkage can be used.

As will be appreciated, the throttle cable or the like, in the United States, generally is on the left side of the vehicle. As such, the location of the throttle linkage 130 defines the location of the left side of the EFI throttle body unit 102. Moreover, the location of the throttle linkage 130 defines the left side of the EFI throttle body unit 102. Thus, to provide a frame of reference, the EFI throttle body unit 102 has two lateral surfaces and one of the lateral surfaces extends parallel to the plane of movement of the throttle linkage 130 (i.e., the sweep of certain components of the throttle linkage 130 is in the front to rear plane, which defines a lateral side of the body unit 102).

In the illustrated configuration, the throttle linkage 130 includes a primary linkage crank 134. The primary linkage crank 134 is coupled for rotation with a primary shaft 136. The primary shaft 136 can be supported for rotation relative to a passage in the core body 102 using two or more bearings, for example but without limitation. At least one valve 132 can be secured to the primary shaft 136 such that the valve 132 rotates with the primary shaft 136. In the illustrated configuration, two butterfly valves 132 are mounted to the primary shaft 136.

Figure 6:
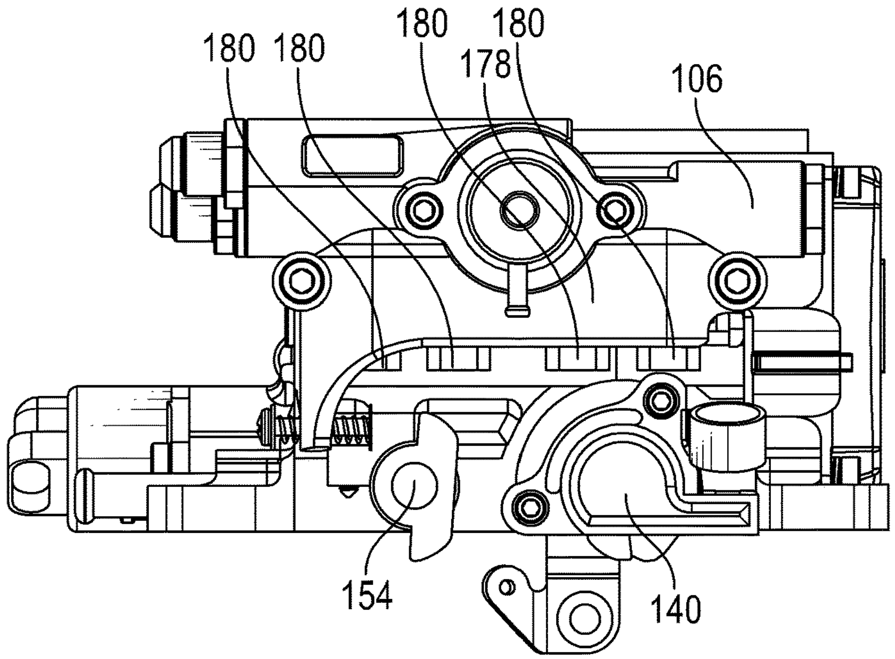
FIG. 6 is a right side view of the EFI throttle body unit of FIG. 2.

As shown in FIG. 6, a throttle position sensor 140 can be connected to the core body 102. The throttle position sensor 140 can detect a rotational orientation of one or more of the throttle valves 132. In the illustrated configuration, the primary shaft 136 registers with the throttle position sensor 140 such that the throttle position sensor 140 can detect the rotational orientation of the primary shaft 136, which serves as a proxy for the actual position of the throttle valves 132. Other arrangements also are possible, including connecting to any component that rotates or otherwise moves in a coordinated fashion with the primary shaft 136.

With reference again to FIGS. 3, 4, and 7, the EFI throttle body unit 102 also includes a secondary linkage crank 142. In the illustrated configuration, the secondary linkage crank 142 is connected for coordinated rotation with the primary linkage crank 134. For example, in the illustrated configuration, a linkage rod assembly 144 interconnects the secondary linkage crank 142 and the primary linkage crank 134. The linkage rod assembly 144 includes a pin 146 that connects the linkage rod assembly to the primary linkage crank 134. The linkage rod assembly 144 also includes a small square linkage nut 150 that connects the linkage rod assembly 144 to the secondary linkage crank 142. A linkage screw adjuster 152 extends between the pin 146 and the linkage screw adjuster. The linkage rod assembly 144, thus, enables adjustment of the relative rotational positions of the primary linkage crank 134 and the secondary linkage crank 142.

The secondary linkage crank 142 is coupled for rotation to a secondary shaft 154. The secondary shaft 154 can be supported for rotation relative to a passage in the core body 102 using two or more bearings, for example but without limitation. At least one valve 132 can be secured to the secondary shaft 154 such that the valve 132 rotates with the secondary shaft 154. In the illustrated configuration, two butterfly valves 132 are mounted to the secondary shaft 154.

A rotation limiter 156 can be connected to the secondary shaft 154. The rotation limiter 156 can have any suitable configuration. In some configurations, the rotation limiter 156 can cooperate with any suitable structure to limit the rotational movement of the secondary shaft 154. In some configurations, the rotation limiter 156 interacts with a structure formed on a side of the core body 102. By limiting rotation of the secondary shaft 154, the rotation limiter 156 also can limit rotation of the primary shaft 136 because the primary shaft and the secondary shaft are interconnected for coordinated movement.

The EFI throttle body unit 100 comprises at least one fuel port 160. In the illustrated configuration, the EFI throttle body unit 100 comprises four possible fuel ports 160. One of the four possible fuel ports 160 can define a fuel return port 162. As such, three of the four possible fuel ports have been identified with the reference numeral 160 while the fourth of the four possible fuel ports has been identified with the reference numeral 162. Any of the three inlet ports 160 can be the inlet from the fuel supply. The other two of the three inlet ports 160 can be plugged using interchangeable plugs 164. The inlet port 160 and the return port 162 can receive a fuel line coupler 166. In the illustrated configuration, the right fuel delivery component 106 includes an indicia 168 that shows which of the ports 160, 162 is the return port 162. In some configurations, the indicia 168 is text that indicates the return (e.g., "RETURN"). In other configurations, a graphical or colored indicator, for example but without limitation, can be used at the indicia 168. In other configurations, a lack of an indicia can be used to indicate the return. In some returnless constructions, the return port 162 also receives a plug 164 instead of a coupler 166.

Fuel delivery lines can connect to the couplers 166. The fuel delivery lines can supply fuel from a fuel supply pump or the like. In some configurations, the fuel delivery system will supply fuel at about 58 psi, for example but without limitation. The left and right components 104, 106 incorporate internal passages 170, 172 (see FIG. 3), which passages 170, 172 function as a fuel rail. In some configurations, a fuel rail can be formed of tubing or the like. In the illustrated configuration, a fuel pressure regulator 171 can be fluidly connected to one or more of the passages 170, 172. Rather than being a component that is positioned elsewhere within the engine compartment or vehicle, the fuel pressure regulator 171 can be supported by, mounted on, carried by or otherwise attached to the EFI throttle body unit 100. In some configurations, the fuel pressure regulator 171 is affixed to or connected to one or more of the left and/or right fuel delivery components 104, 106. In the illustrated configuration, a regulator hold-down 173 can be used to secure the fuel pressure regulator 171 in position on one of the left and right fuel delivery components 104, 106. The regulator hold-down 173 can be secured to the throttle body unit 100 in any suitable manner. In the illustrated configuration, the regulator hold-down 173 (and therefore the pressure regulator 171) is secured to the right component 106 using threaded fasteners or the like. Other arrangements also can be used. Advantageously, mounting the fuel pressure regulator 171 to the unit 100 provides a simple way of replacing the fuel pressure regulator 171 with units having different pressures. The illustrated configuration, therefore, simplifies the use of the unit 100 with a plurality of high pressure fuel pressure regulators suitable for use with, for example, high pressure MPI injectors.

In the illustrated configuration, the two internal passages 170, 172 in the components 104, 106 are interconnected using one or more transfer passage 169. In the illustrated configuration, two transfer passages 169 interconnect the two passages 170, 172. In some configurations, the two transfer passages 169 extend along the front side and the rear side of the core body 102. In the illustrated configuration, the transfer passages 169 and the passages 170, 172 intersect in a region adjacent to the plugs 164 and couplers 166. The internal passages 170, 172 fluidly communicate with fuel injectors 174 (see FIG. 4). In the illustrated configuration, four fuel injectors 174 are connected to each of the internal passages 170, 172. Other numbers of fuel injectors can be used.

The fuel injectors 174 are not positioned along the front or rear vertical surfaces of the illustrated throttle body unit 100. Rather, in the illustrated configuration, the fuel injectors are positioned along the side surfaces of the throttle body unit 100. In the illustrated configuration, at least one of the fuel injectors 174 is positioned at least partially vertically below the passage contained within the left component 104. In the illustrated arrangement, at least one of the fuel injectors 174 is positioned at least partially vertically below the passage contained within the right component. As shown in FIG. 4, the left and right components 104, 106 can include a downwardly extending wall 176, 178. The fuel injectors 174 can be tucked up into a pocket defined by each of the walls 176, 178. The fuel injectors 174 are obscured from view by the walls 176, 178. Because the injectors 174 are positioned along the sides of the EFI throttle body unit 100, having the walls 176, 178 obscure the injectors 174 from view provides a cleaner appearance for the unit 100.

Figure 7:
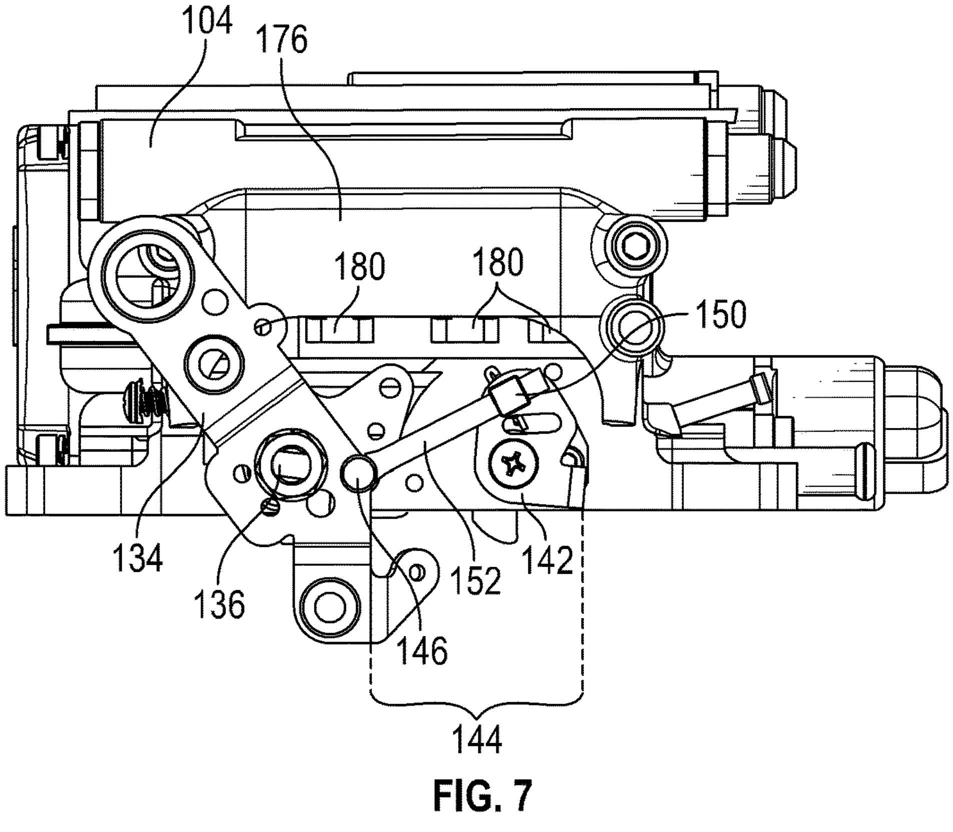
FIG. 7 is a left side view of the EFI throttle body unit of FIG. 2.
Figure 8:
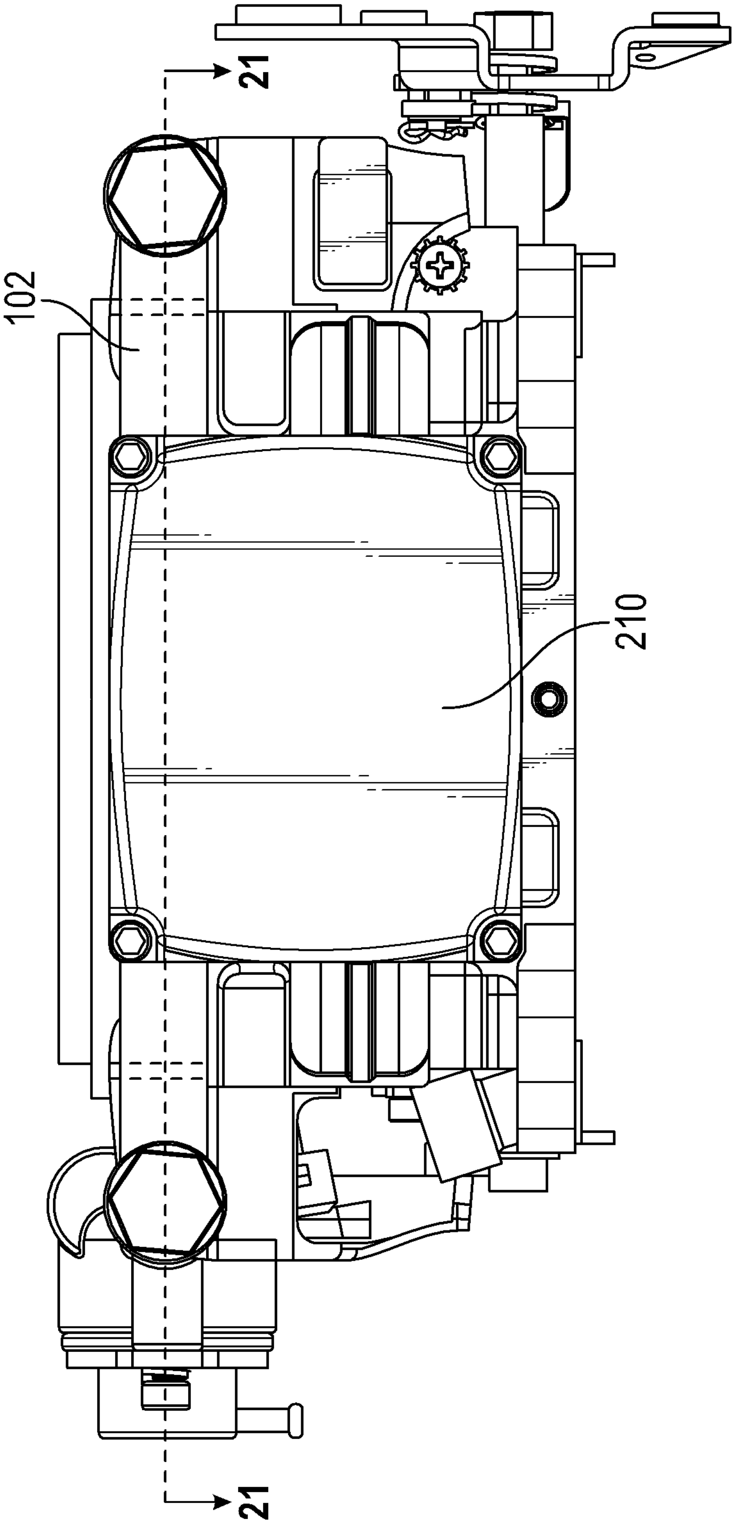
FIG. 8 is a front view of the EFI throttle body unit of FIG. 2.
Figure 9:
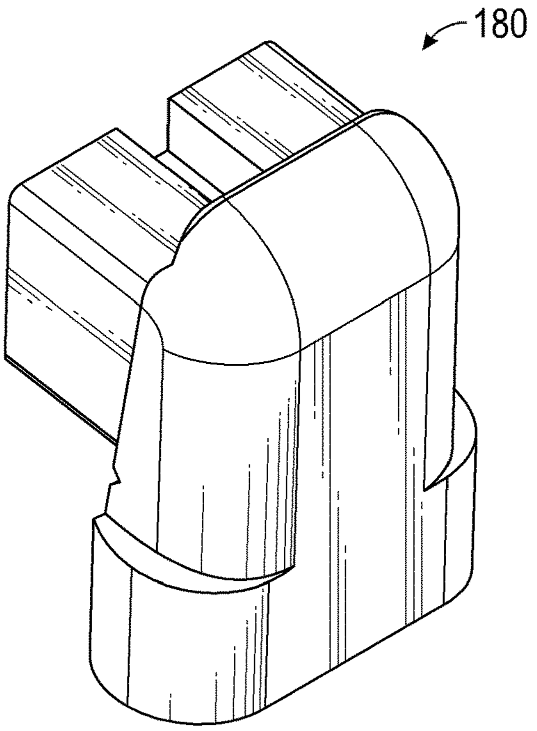
FIG. 9 is a perspective view of a fuel injector connector used in the EFI throttle body unit of FIG. 2.
Figure 10:
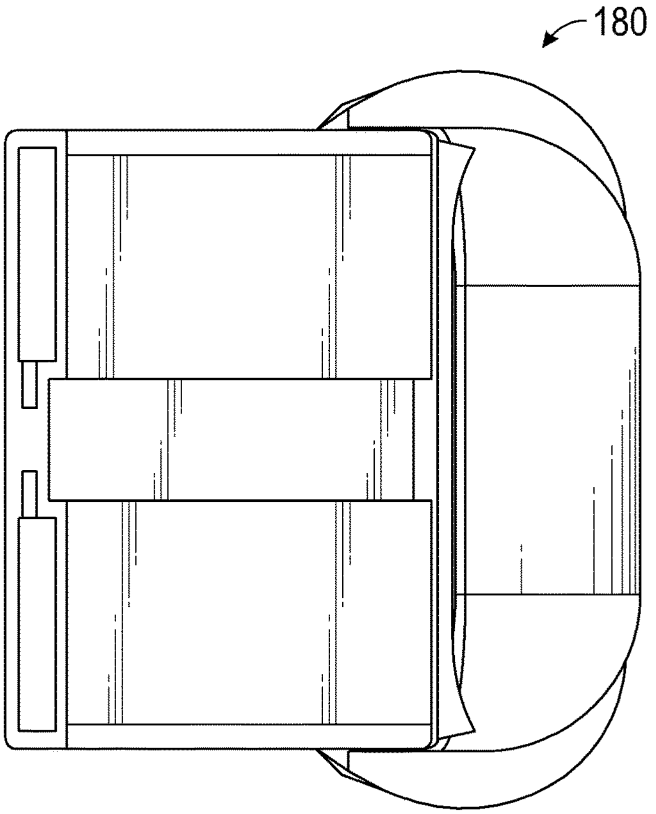
FIG. 10 is a top view of the fuel injector connector of FIG. 9.
Figure 11:
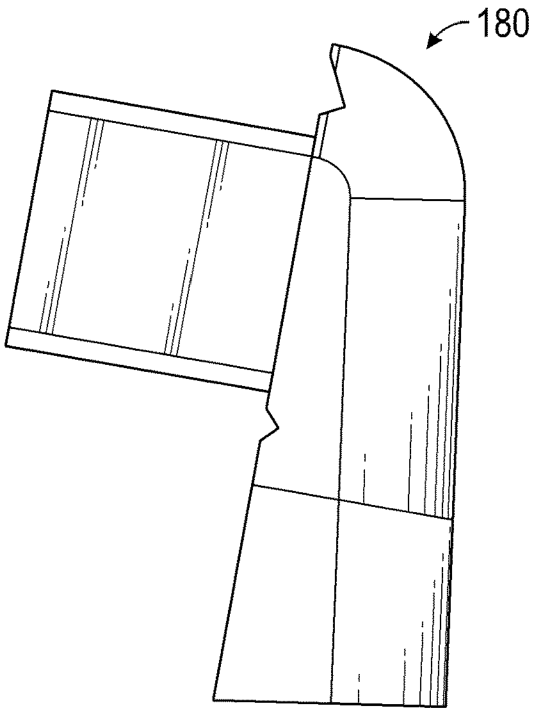
FIG. 11 is a left side view of the fuel injector connector of FIG. 9.
Figure 12:
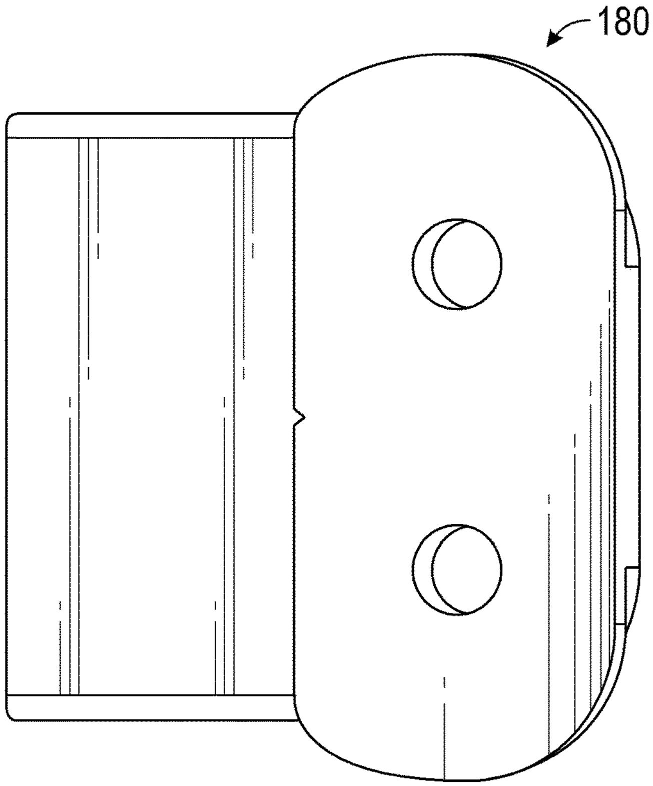
FIG. 12 is bottom view of the fuel injector connector of FIG. 9.
Figure 13:
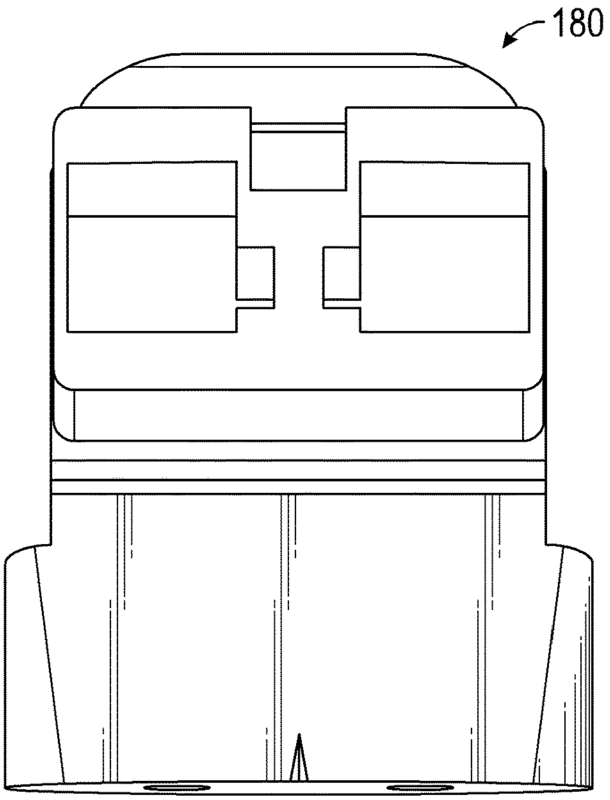
FIG. 13 is front view of the fuel injector connector of FIG. 9.
Figure 14:
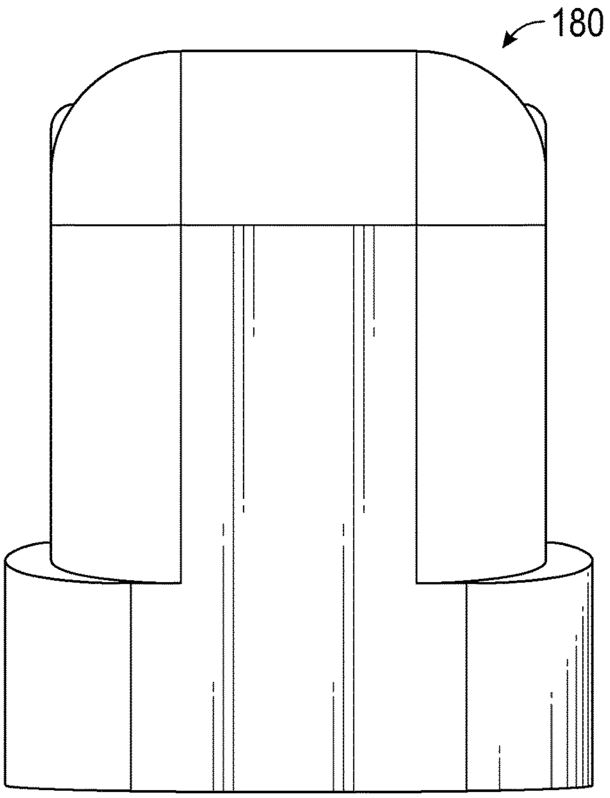
FIG. 14 is a rear view of the fuel injector connector of FIG. 9.
Figure 15:
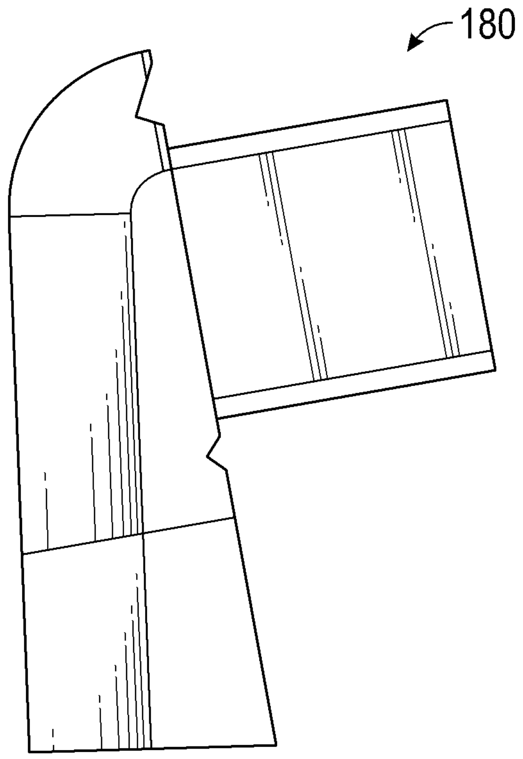
FIG. 15 is a right side view of the fuel injector connector of FIG. 9.

In the illustrated configuration, a plurality of angled injector connectors 180 is provided. The connectors 180 are secured to the fuel injector 174 by the left and right components 104, 106, respectively. In some configurations, including the illustrated configuration, the connectors 180 are unique in that they do not feature a clipping element. In other words, the connectors 180 are secured in position relative to the fuel injectors 174 without the use of a clipping component. In the illustrated configurations, the connectors 180 are interference fit into position. For example, the connectors 180 are positioned within the pockets defined by the walls 176, 178. In the illustrated configuration, the connectors 180 are secured in position between the fuel injectors 174 and the walls 176, 178. In some configurations, the connectors 180 can be secured in position by the fuel injectors 174 and an outer surface of the core body 102. In some configurations, the connectors 180 can be secured in position between the walls 176, 178 and an outer surface of the core body 102. Any other suitable configuration also can be used. The connectors 180 are compactly arranged and have a distinct ornamental appearance. An example of one of the connectors 180 is shown in FIGS. 9-15. In some configurations, at least a portion of the connectors is exposed below a lower edge of the walls 176, 178. For example, as shown in FIGS. 6 and 7, while the injectors 174 are hidden by the walls 176, 178, at least a portion of the connectors 180 can remain exposed. In some configurations, the entirety of the connectors 180 also can be shrouded by the walls 176, 178. Moreover, because the connectors 180 are short and positioned vertically above the linkages 136, 144, the connectors 180, while being positioned on the same side of the throttle body unit 100 as one or more of the linkages 136, 144, the connectors 180 do not interfere with either of the linkages 136, 144.

Figure 3:
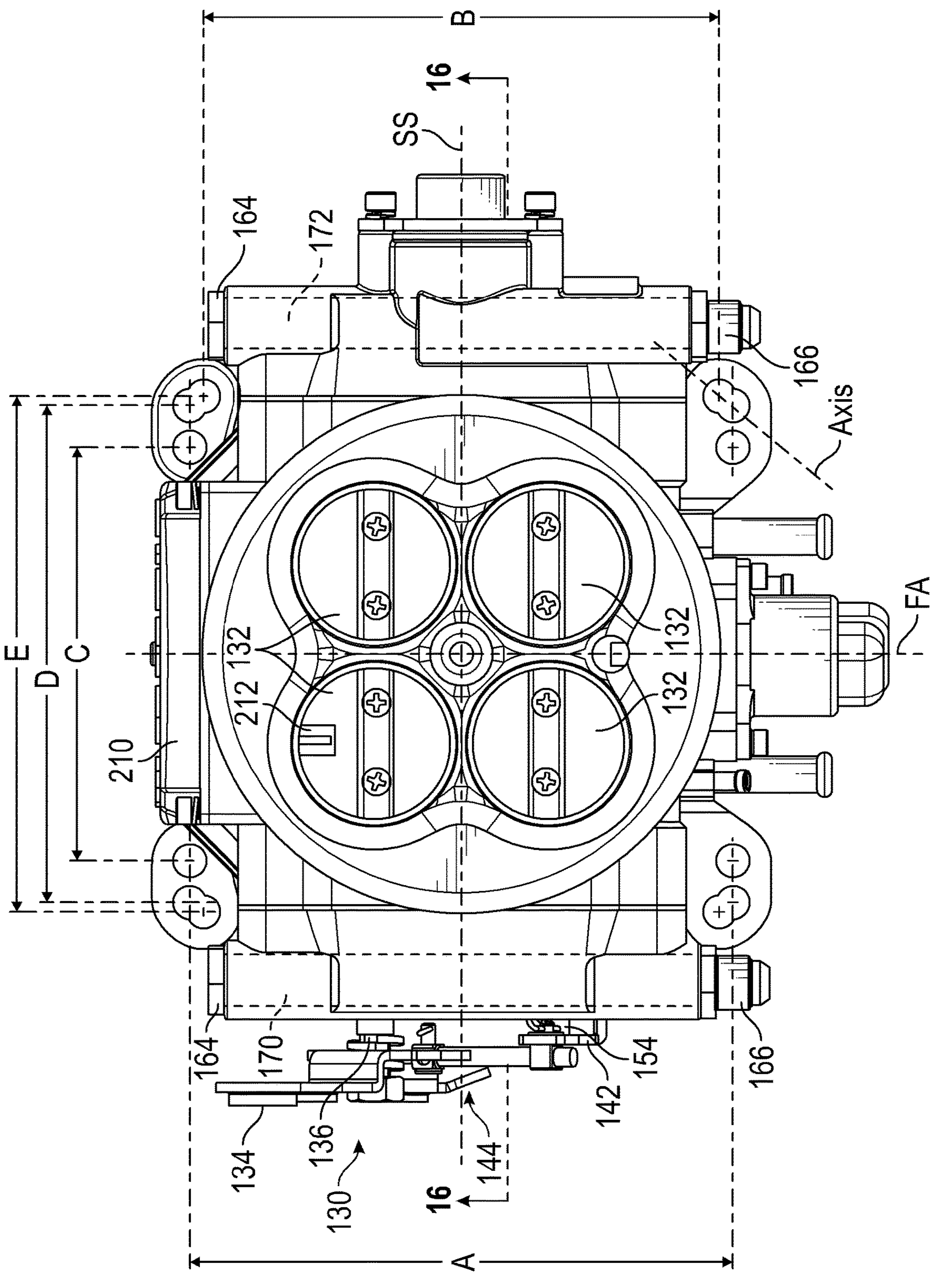
FIG. 3 is a top view of the EFI throttle body unit of FIG. 2.
Figure 16:
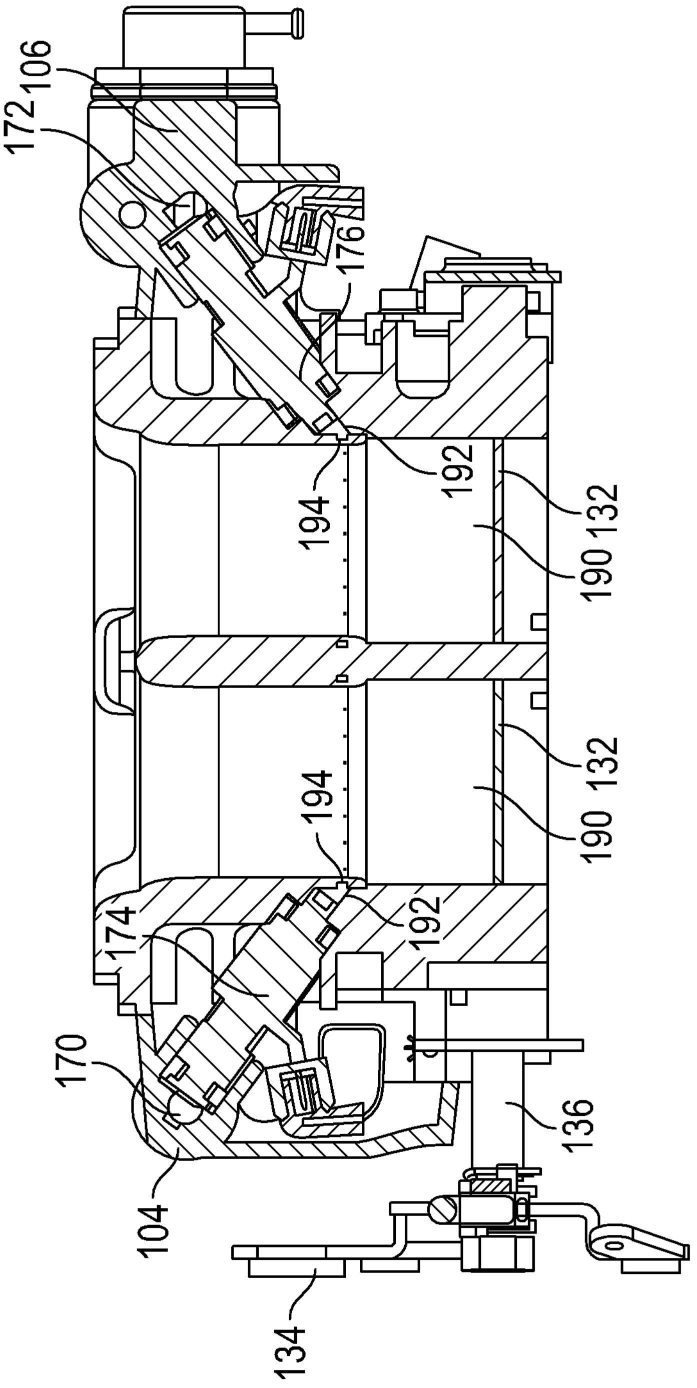
FIG. 16 is a section through the EFI throttle body unit taken along the line 16-16 in FIG. 3.
Figure 17:
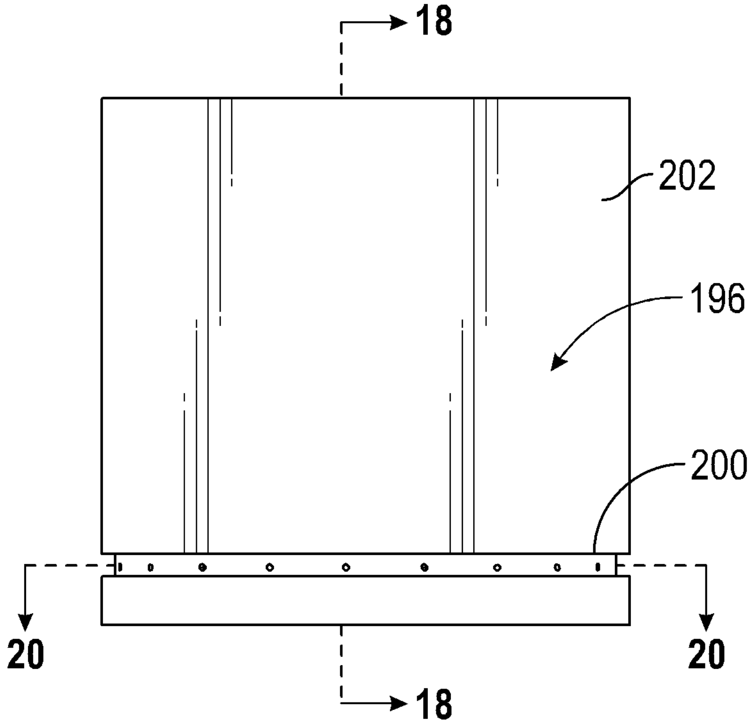
FIG. 17 is a side view of an air intake sleeve used in the EFI throttle body unit of FIG. 2.

With reference now to FIG. 16, a section taken along the line 16-16 in FIG. 3 illustrates more of the fuel delivery circuit. As discussed above, the left and right components 104, 106 include passages 170, 172, respectively. An axial direction of each of the passages 170, 172 extends front to back relative to the EFI throttle body unit 102. In the illustrated configuration, the axial direction of the passages 170, 172 extends perpendicular or normal to the axis of each of the primary and secondary shafts 136, 154. The passages 170, 172 are shown positioned at or near the top of the EFI throttle body unit 100. In some configurations, the passages 170,172 can be positioned at the vertical center or at or near the bottom of the EFI throttle body unit 100. The upper position, which is shown, allows for the injectors 174 to be hidden from view through the use of the walls 176, 178. The passages 170, 172 feed the fuel injectors 174. The fuel injectors 174 extend side to side and downward relative to the EFI throttle body unit 102. The angled injector connectors 180 also are connected to the fuel injectors 174.

The EFI throttle body unit 100, and more specifically the core body 102, defines at least one air intake passage 190. In the illustrated configuration, the core body 102 defines four air intake passages 190. In some configurations, the core body 102 can define two air intake passages. In some configurations, the core body 102 can define more than two air intake passages. The illustrated air intake passages 190 extend vertically through the core body 102. Air passes from top to bottom through the illustrated air intake passages 190. The volume of air delivered through the passages can be controlled by the butterfly valves 132. The valves 132 are positioned in a lower portion of the illustrated air intake passages 190.

In some configurations, an idle air control valve 191 also can be mounted to the core body 102. The idle air control valve 191 opens a small bypass circuit that allows air to flow around the throttle valves 132, thereby increasing the volume of air during idle operation and increasing idle speed. The idle air control valve 191 can be mounted in any suitable manner and in any suitable location.

With continued reference to FIG. 16, each of the fuel injectors 174 delivers fuel into a short connector passage 192. The short connector passages 192 extend between the nozzle(s) of the fuel injectors 174 and a fuel delivery passage 194. In the illustrated configuration, the fuel delivery passage 194 extends annularly around an outside of each of the air intake passages 190. The annular fuel delivery passage 194 can be formed in any suitable manner.

In some configurations, a sleeve 196 can be positioned within at least a portion of the air intake passage 190. With reference still to FIG. 16, the illustrated sleeve 196 is positioned vertically higher than the butterfly valve 132. The sleeve 196 can have a lower end that is vertically higher than the butterfly valve 132. The sleeve 196 can extend more than half of the total length of the air intake passage 190. In some configurations, one or more axial end of the sleeve 196 can be tapered in thickness. In the illustrated configuration, both axial ends of the sleeve 196 are tapered in thickness.

The sleeve 196 can be secured in position in any suitable manner. In some configurations, the sleeve 196 is press-fit into the opening defining the air intake passage 190 in the core body 102. In some configurations, the sleeve 196 can be threaded into position within at least a portion of the core body 102. In some configurations, the sleeve 196 can be mechanically secured in place, can be adhered, can be cohered, or can be welded, for example but without limitation.

In the illustrated configuration, the annular fuel delivery passage 194 is defined by one or more of the core body 102 and the sleeve 196. As shown in FIGS. 17-20, at least a portion of the passage 194 can be defined by one or more groove 200 formed in an outer surface 202 of the sleeve 196. The groove 200 can be formed in any desired location along the sleeve 196. In the illustrated configuration, the groove 200 is formed in, along or adjacent a lower portion of the sleeve 196. In some configurations, the groove 200 can be formed in, along or adjacent the lower ⅓ of the sleeve 196. In some configurations, the groove 200 can be formed in, along or adjacent the lower ⅙ of the sleeve 196. The groove 200 preferably is positioned such that it aligns with the connector passage 192 and/or the nozzle of the fuel injector 174. While the illustrated groove has square walls or a wall that protrudes laterally outward, other shapes or configurations of grooves can be used.

As discussed above, the delivery passage 194 can be defined by one or more of the core body 102 and the sleeve 196. In the illustrated configuration, together with the groove 200, a wall of the core body 102 defines the delivery passage 194. Atomized fuel can be delivered into the delivery passage 194 prior to being introduced into the air intake passage 190. The atomized fuel can circulate through the delivery passage 194, thereby encircling at least a portion of the circumference of the respective air intake passage such that the atomized fuel can be introduced in various locations around the periphery of the illustrated air intake passage 190.

Figure 18:
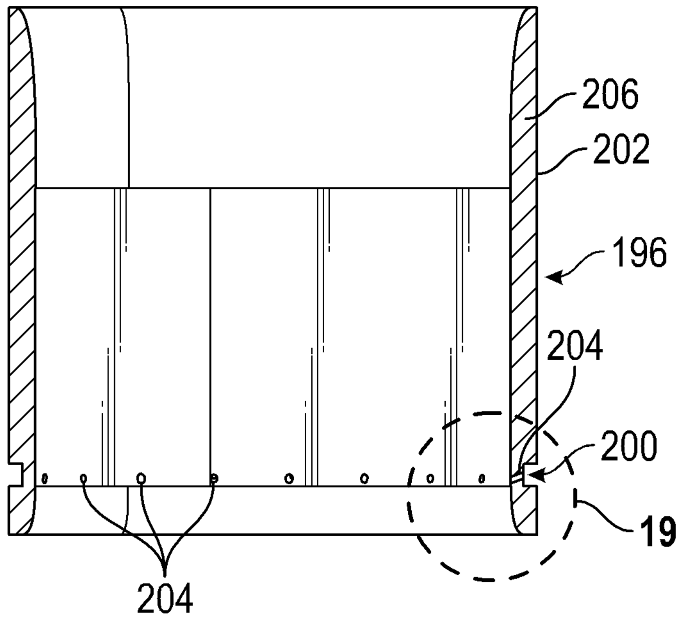
FIG. 18 is a vertical section of the air intake sleeve of FIG. 17 taken along the line 18-18.
Figure 19:
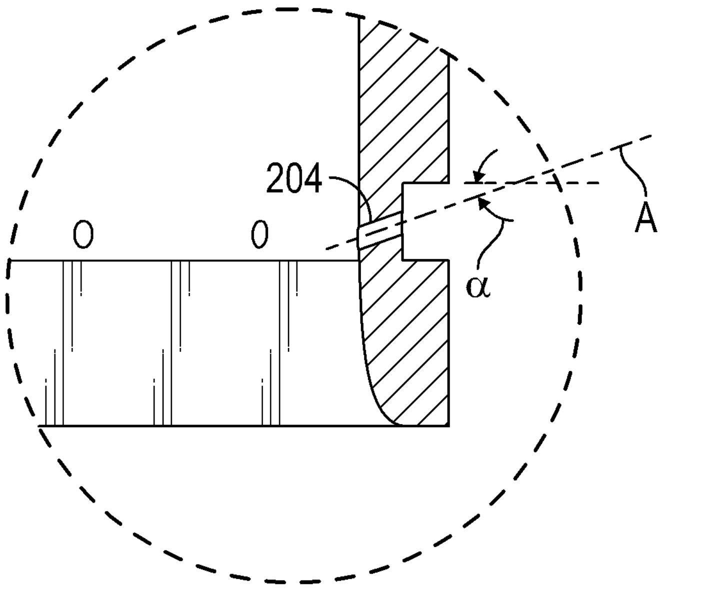
FIG. 19 is an enlarged view of a portion of FIG. 18 showing an orifice and annular passage defined in the air intake sleeve.

With reference now to FIGS. 18 and 19, a plurality of orifices 204 can extend through a wall 206 of the sleeve 196. The orifices 204 can extend through the wall 206 in the region of the groove 200. In the illustrated configuration, the orifices 204 are uniform in size, shape and orientation. In some configurations, the orifices 204 can have differing sizes, differing shapes and differing orientations. In some configurations, each of the orifices has a diameter of 1.5 mm. When combined together, the number of orifices 204 with the size of the orifices 204 can provide a flow of With 1.5 mm diameter holes and eight 80 pound fuel injectors, 20 holes are desired. With 1.5 mm diameter holes and four fuel injectors, 15 holes are desired. Any suitable configuration (e.g., combination of number and size) keeping in mind a desire to allow the necessary throughput while also creating the desired flow pattern and pressure (e.g., not unduly restrict flow while building just enough backpressure to create spray through orifices).

In some configurations, the orifices 204 are uniformly spaced around the perimeter of the air intake passage. In some configurations, the orifices have centers that are separated by an angle of 18 degrees (e.g., 360 degrees with 20 orifices). In some configurations, the angular separation can be less than 18 degrees (e.g., smaller orifices). In some configurations, the angular separation can be more than 18 degrees (e.g., larger orifices). In some configurations, none of the orifices can be classified as a “primary orifice.” In some configurations, each of the orifices 204 is circular. In some configurations, none of the orifices 204 is a slot. In some configurations, there is no primary orifice aligned with an outlet from the fuel injector. In some configurations, there is no orifice aligned with an axial center of an outlet from the fuel injector. In some configurations, any orifice overlapping with the connector passage 192 is the same size as, or smaller than, orifices located in other regions of the sleeve 196. In some configurations, the orifices 204 are disposed in a single plane along the sleeve 196. In some configurations, the orifices 204 are aligned along multiple planes along the sleeve. In some such configurations, the orifices 204 are aligned along at least two spaced apart but parallel planes.

Figure 20:
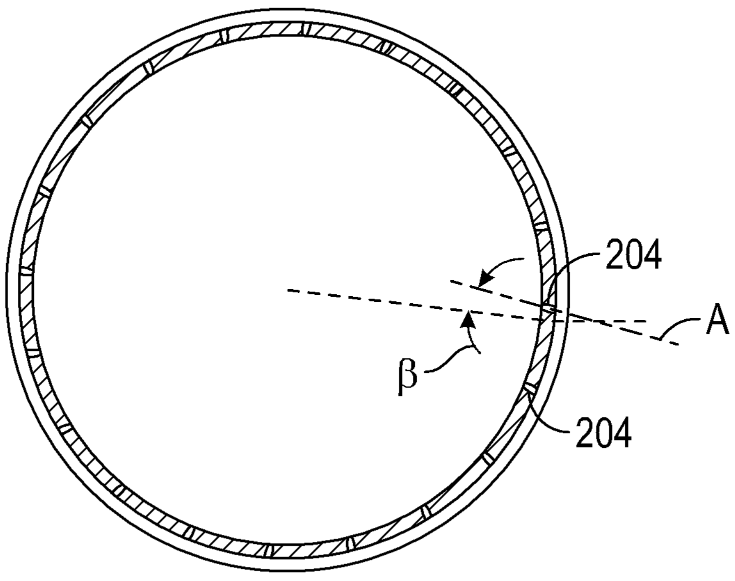
FIG. 20 is a horizontal section of the air intake sleeve of FIG. 17 taken along the line 20-20.

Advantageously, the illustrated orifices 204 direct atomized fuel from the passage 194 into the air intake passage 190 in a downward and circular manner. In some configurations, the orifices 204 do not extend directly radial and horizontal. In other words, the axes A of the one or more of the orifices 204 extend downward relative to horizontal by an angle $\alpha$. In some configurations, the angle $\alpha$ is between 5 degrees and 25 degrees. In one configuration, the angle $\alpha$ is 15 degrees. By directing the streams of atomized fuel downward, the streams of atomized fuel can impinge upon the butterfly valve 132. In some configurations, by directing the streams of atomized fuel downward, the streams of atomized fuel is less likely to simply collide in the center of the air intake passage. Moreover, as shown in FIG. 20, the orifices 204 also do not extend radially from a center axis of the air intake passages 190 or sleeve 196; rather, in the illustrated configuration, the axis A of the orifices 204 are at an angle of $\beta$ relative to a true radial direction. In some configurations, the angle β is between 1 degree and 10 degrees. In one configuration, the angle β is 5 degrees. By offsetting the axis A from a true radial direction, the orifices 204 can induce a plurality of swirling streams of atomized fuel. Through the angling of the orifices 204, the atomized fuel is directed toward the circumference of the throttle valve. Together, the downward and circular streams have been found to produce improved performance, especially when introduced vertically higher than (e.g., upstream of) the throttle valves.

Figure 21:
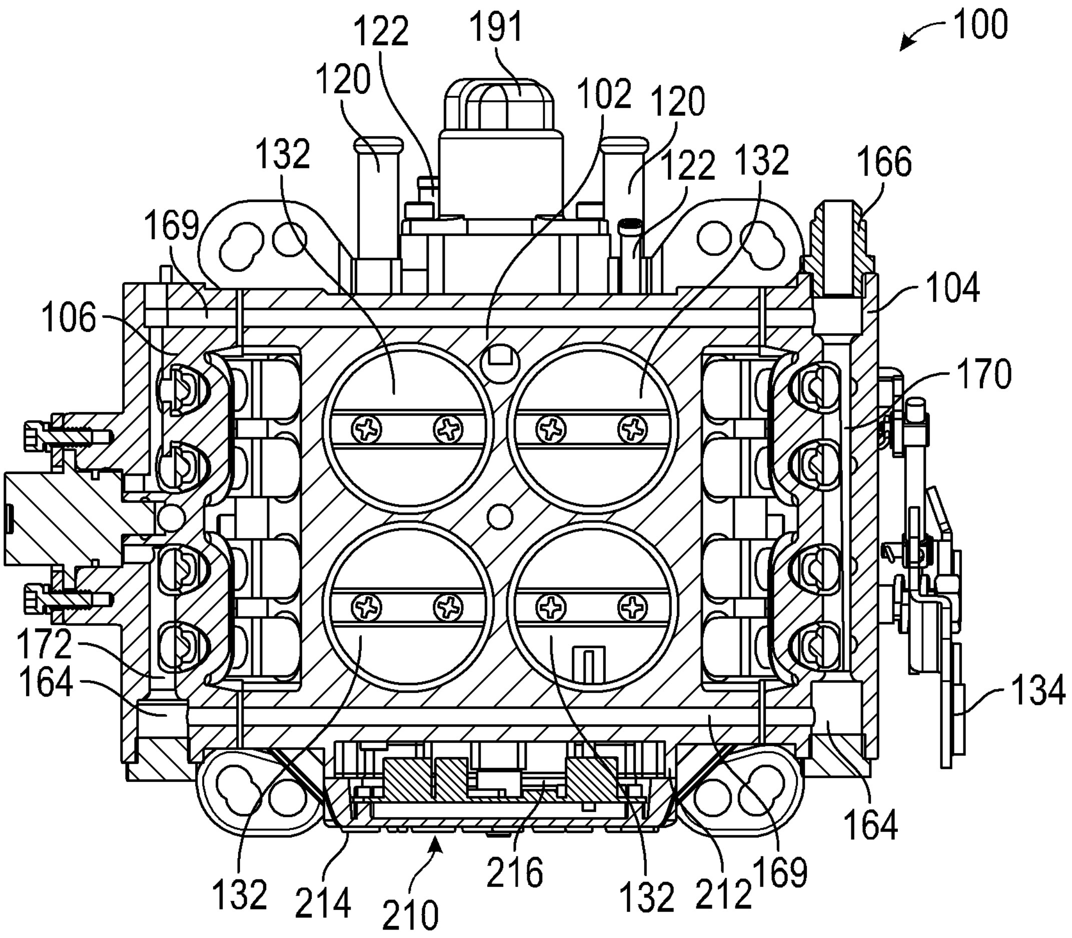
FIG. 21 is a horizontal section view of the EFI throttle body of FIG. 2 taken along the line 21-21 in FIG. 8.

With reference again to FIG. 2, an ECU box 210 can be mounted to the front of the EFI throttle body unit 100. As shown in FIG. 21, the ECU box 210 can include a base 212 and a cover 214. In some configurations, the base is integrally formed as a monolithic component with the core body 102. In some configurations, the base is formed separate of the core body 102 and attached using threaded connectors or the like. The cover can be secured to the base and/or the core body 102 in any suitable manner. In some configurations, the cover can be secured using threaded fasteners or the like. In one configuration, the combined outer dimension of the depth of the box (e.g., the amount added to the length of the unit 100 by the box 210) is less than 20 mm. In some configurations, the box defines a housing with an outer dimension of less than 13 mm. In some configurations, when viewed from the top, the box 210 fits within a footprint defined by the mounting feet 110. In some configurations, the box 210 fits within a space defined by a forward most portion of the feet 110 and the front surface of the core body 102. In some configurations, the box 210 laterally fits into a region defined between the feet 110. Other configurations are possible.

The ECU box 210 contains all or substantially all of the electronics 216 used to control operation of the fuel injectors 174. The circuitry contained within the ECU box 210 is connected to the connectors 180 such that the circuitry contained within the ECU box 210 can drive the fuel injectors 174. By mounting the ECU box 210 directed onto the throttle body unit 100, remote mounting of an ECU module and related wire harnesses can be reduced or eliminated. As such, the ECU box 210 results in a clearer appearance for the installation.

The EFI throttle body unit 100 also carries most of the sensors needed for operation. For example, as described above, the throttle position sensor 140 is mounted to the throttle body unit 100. In addition, a manifold absolute pressure sensor can be provided in any suitable portion of the throttle body. Furthermore, an intake air temperature sensor can be positioned within a cage 212 that extends into one of the air intake passages 190. Further, a fuel pressure sensor can be mounted to the throttle body unit 100.

While many of the sensors are positioned on the throttle body unit 100 itself, thereby simplifying installation, one or more sensor may need to be located away from the throttle body unit 100. For example, a wide band oxygen sensor (not shown) can be mounted to the exhaust system in a suitable location. The sensor provides input to the controller of the ECU that allows that controller to make continuous adjustments in the fuel delivery to provide correct or desired air/fuel ratio under any and/or all climate/altitude conditions. The sensor can be installed on either exhaust bank, about 2-4 inches after the exhaust collector and at least 18 inches from the exhaust tip. If the installation is in conjunction with short or open headers, then the sensor can be installed in the primary tube of the rear cylinder at least 8 inches from the exhaust port. In some configurations, the sensor can be installed 10 degrees above horizontal to allow condensation to run off of the sensor. Preferably, the sensor is installed ahead of any catalytic converter but not on the outside of any bend in the exhaust tubing. To simplify installation, the sensor can be installed in a welded or clamped bung that has been installed in a desired position along the exhaust system.

Two other sensors or components that are not mounted to the throttle body unit 100 include a component (not shown) that provides a trigger tachometer signal, which can be delivered from connection to the negative post on a 12V coil or, when used with an HEI distributor, from the "Tach" terminal on the HEI distributor cap, and a coolant temperature sensor. The coolant temperature sensor can thread into one of the ports in the intake manifold or cylinder head (the threaded connection should be sealed with Teflon tape or quality pipe sealant).

In the illustrated configuration, the throttle body unit 100 can be assembled in a first configuration or an opposite second configuration. In other words, it is possible for the linkage to be swapped as well as the throttle position sensor, for example but without limitation. Thus, the illustrated configuration facilitates reversal of the componentry of the throttle body unit 100.

In use, fuel is supplied through the fuel inlet port 160. From the fuel entry port 160, the fuel passes through the passages 170, 172 and is delivered to the fuel injectors 174. The fuel injectors 174 inject the fuel into the annular passageway 194 through the short connector passage 192. From the annular passageway 194, the fuel enters into the air intake passages through the orifices 204. The orifices 204 are positioned to direct the fuel downward (i.e., in the direction of airflow) and in a direction that is not radial. In the illustrated configuration, the fuel enters the air flow through the air intake passages prior to passing through the throttle valves.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include these features, elements and/or states.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

While the above detailed description may have shown, described, and pointed out novel features as applied to various embodiments, it may be understood that various omissions, substitutions, and/or changes in the form and details of any particular embodiment may be made without departing from the spirit of the disclosure. As may be recognized, certain embodiments may be embodied within a form that does not provide all of the features and benefits set forth herein, as some features may be used or practiced separately from others.

Additionally, features described in connection with one embodiment can be incorporated into another of the disclosed embodiments, even if not expressly discussed herein, and embodiments having the combination of features still fall within the scope of the disclosure. For example, features described above in connection with one embodiment can be used with a different embodiment described herein and the combination still fall within the scope of the disclosure.

It should be understood that various features and aspects of the disclosed embodiments can be combined with, or substituted for, one another in order to form varying modes of the embodiments of the disclosure. Thus, it is intended that the scope of the disclosure herein should not be limited by the particular embodiments described above. Accordingly, unless otherwise stated, or unless clearly incompatible, each embodiment of this disclosure may comprise, additional to its essential features described herein, one or more features as described herein from each other embodiment disclosed herein.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added.

Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, 0.1 degree, or otherwise.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

Unless the context clearly requires otherwise, throughout the description and the claims, the words "comprise", "comprising", and the like, are to be construed in an inclusive sense as opposed to an exclusive or exhaustive sense, that is to say, in the sense of "including, but not limited to".

Reference to any prior art in this description is not, and should not be taken as, an acknowledgement or any form of suggestion that that prior art forms part of the common general knowledge in the field of endeavor in any country in the world.

The invention may also be said broadly to consist in the parts, elements and features referred to or indicated in the description of the application, individually or collectively, in any or all combinations of two or more of said parts, elements or features.

Where, in the foregoing description, reference has been made to integers or components having known equivalents thereof, those integers are herein incorporated as if individually set forth. In addition, where the term "substantially" or any of its variants have been used as a word of approximation adjacent to a numerical value or range, it is intended to provide sufficient flexibility in the adjacent numerical value or range that encompasses standard manufacturing tolerances and/or rounding to the next significant figure, whichever is greater.

It should be noted that various changes and modifications to the presently preferred embodiments described herein will be apparent to those skilled in the art. Such changes and modifications may be made without departing from the spirit and scope of the invention and without diminishing its attendant advantages. For instance, various components may be repositioned as desired. It is therefore intended that such changes and modifications be included within the scope of the invention. Moreover, not all of the features, aspects and advantages are necessarily required to practice the present invention. Accordingly, the scope of the present invention is intended to be defined only by the claims.

What is claimed is:

1. A bolt-on electronic fuel injection throttle body unit designed to fit single and dual carburetor manifolds, the throttle body unit comprising a core body, the core body comprising a left side and a right side, a left fuel delivery component being connected to the left side of the core body and a right fuel delivery component being connected to the right side of the core body, a left integrated fuel passage formed in the left fuel delivery component, a right integrated fuel passage formed in the right fuel delivery component, at least one axial end of the left integrated fuel passage receiving a plug or a port, at least one axial end of the right integrated fuel passage receiving a plug or a port, at least one left fuel injector in fluid communication with the left integrated fuel passage, the at least one left fuel injector being positioned at least partially vertically lower than the left integrated fuel passage, at least one right fuel injector in fluid communication with the right integrated fuel passage, the at least one right fuel injector being positioned at least partially vertically lower than the right integrated fuel passage, an electronic control unit being mounted to a side of the core body other than the left side and the right side, and a throttle linkage connected to the core body, the throttle linkage being positioned on one of the left side and the right side, the throttle linkage comprising a primary linkage crank, the primary linkage crank being coupled for rotation with a primary shaft, the primary shaft being supported for rotation relative to a passage in the core body, at least one valve being secured to the primary shaft such that the at least one valve rotates with the primary shaft.

2. The bolt-on electronic fuel injection throttle body unit of claim 1, further comprising a fuel pressure regulator mounted on the fuel injection throttle body unit.

3. The bolt-on electronic fuel injection throttle body unit of claim 1, further comprising a throttle position sensor that detects a rotational orientation of the at least one throttle valve.

4. The bolt-on electronic fuel injection throttle body unit of claim 1, further comprising a secondary linkage crank, the secondary linkage crank being connected for coordinated rotation with the primary linkage crank.

5. The bolt-on electronic fuel injection throttle body unit of claim 1, wherein connectors are secured in position relative to the at least one left fuel injector and the at least one right fuel injector without the use of a clipping component.

6. The bolt-on electronic fuel injection throttle body unit of claim 1, wherein the left integrated fuel passage and the right integrated fuel passage are interconnected via an interconnecting passage.

7. The bolt-on electronic fuel injection throttle body unit of claim 6, wherein the interconnecting passage comprises tubing in fluid communication with the left integrated fuel passage and the right integrated fluid passage.

8. The bolt-on electronic fuel injection throttle body unit of claim 1, wherein the core body comprises four vertically extending passages.

9. The bolt-on electronic fuel injection throttle body unit of claim 8, wherein at least one annular fuel delivery passageway is defined along each of the four vertically extending passages.

10. The bolt-on electronic fuel injection throttle body unit of claim 9, wherein the at least one left fuel injector and the at least one right fuel injector deliver fuel to the annular fuel delivery passageways.

11. An electronic fuel injection throttle body unit, the throttle body unit comprising:

a core body having at least a first side and a second side;

a first fuel delivery component connected to the first side of the core body and having a first integrated fuel passage formed therein;

a second fuel delivery component connected to the second side of the core body and having a second integrated fuel passage formed therein;

a first fuel injector in fluid communication with the first integrated fuel passage;

second fuel injector in fluid communication with the second integrated fuel passage;

an electronic control unit being mounted to a side of the core body other than the first side and the second side, a primary shaft supported for rotation about a first axis and secured to at least one valve disposed within a passage in the core body; and a throttle linkage positioned on one of the first side and the second side of the core body and coupled for rotation with the primary shaft.

12. The electronic fuel injection throttle body unit of claim 11, additionally comprising tubing in fluid communication with the first integrated fuel passage and the second integrated fluid passage.

13. The electronic fuel injection throttle body unit of claim 11, additionally comprising a fuel pressure regulator mounted on the fuel injection throttle body unit.

14. The electronic fuel injection throttle body unit of claim 11, wherein at least one axial end of the first integrated fuel passage receives a plug or a port, and wherein at least one axial end of the second integrated fuel passage receives a plug or a port.

15. The electronic fuel injection throttle body unit of claim 11, wherein the first fuel injector is positioned at least partially vertically lower than the first integrated fuel passage and the second fuel injector is positioned at least partially vertically lower than the second integrated fuel passage.

16. An electronic fuel injection throttle body unit, the throttle body unit comprising:

a core body having at least first side, a second side;

a first passage including a first fuel delivery pathway;

a second passage including a second fuel delivery pathway;

a first fuel delivery component on the first side of the core body and comprising a first integrated fuel passage;

a second fuel delivery component on the second side of the core body and comprising a second integrated fuel passage;

a first fuel injector in fluid communication with the first integrated fuel passage and the first fuel delivery pathway;

second fuel injector in fluid communication with the second integrated fuel passage and the second fuel delivery pathway;

a primary shaft extending along a first axis and coupled to at least a first valve disposed within the first passage and a second valve disposed within the second passage; and a throttle linkage positioned on one of the first side and the second side of the core body and coupled for rotation with the primary shaft.

17. The electronic fuel injection throttle body unit of claim 16, wherein the first and second fuel delivery pathways comprise annular fuel delivery pathways, wherein the first annular fuel delivery pathway is located within the first passage and above the first valve, and wherein the second annular fuel delivery pathway is located within the second passage and above the second valve.

18. The electronic fuel injection throttle body unit of claim 16, further comprising tubing in fluid communication with each of the first and second integrated fuel passages.

19. The electronic fuel injection throttle body unit of claim 16, wherein the first fuel delivery component covers at least a portion of the first fuel injector, and wherein the second fuel delivery component covers at least a portion of the second fuel injector.

20. The electronic fuel injection throttle body unit of claim 17, further comprising:

a third passage including a third fuel delivery pathway and a fourth passage including a fourth fuel delivery pathway; and a secondary shaft configured for coordinated rotation with the primary shaft, the secondary shaft extending along a second axis parallel to the first axis, the secondary shaft coupled to at least a third valve disposed within the third passage and a fourth valve disposed within the fourth passage.

* * * * *